No. 706,260. Patented Aug. 5, 1902.
J. L. SCHUREMAN.
PRESSURE REGULATOR.
(Application filed May 31, 1902.)
(No Model.)
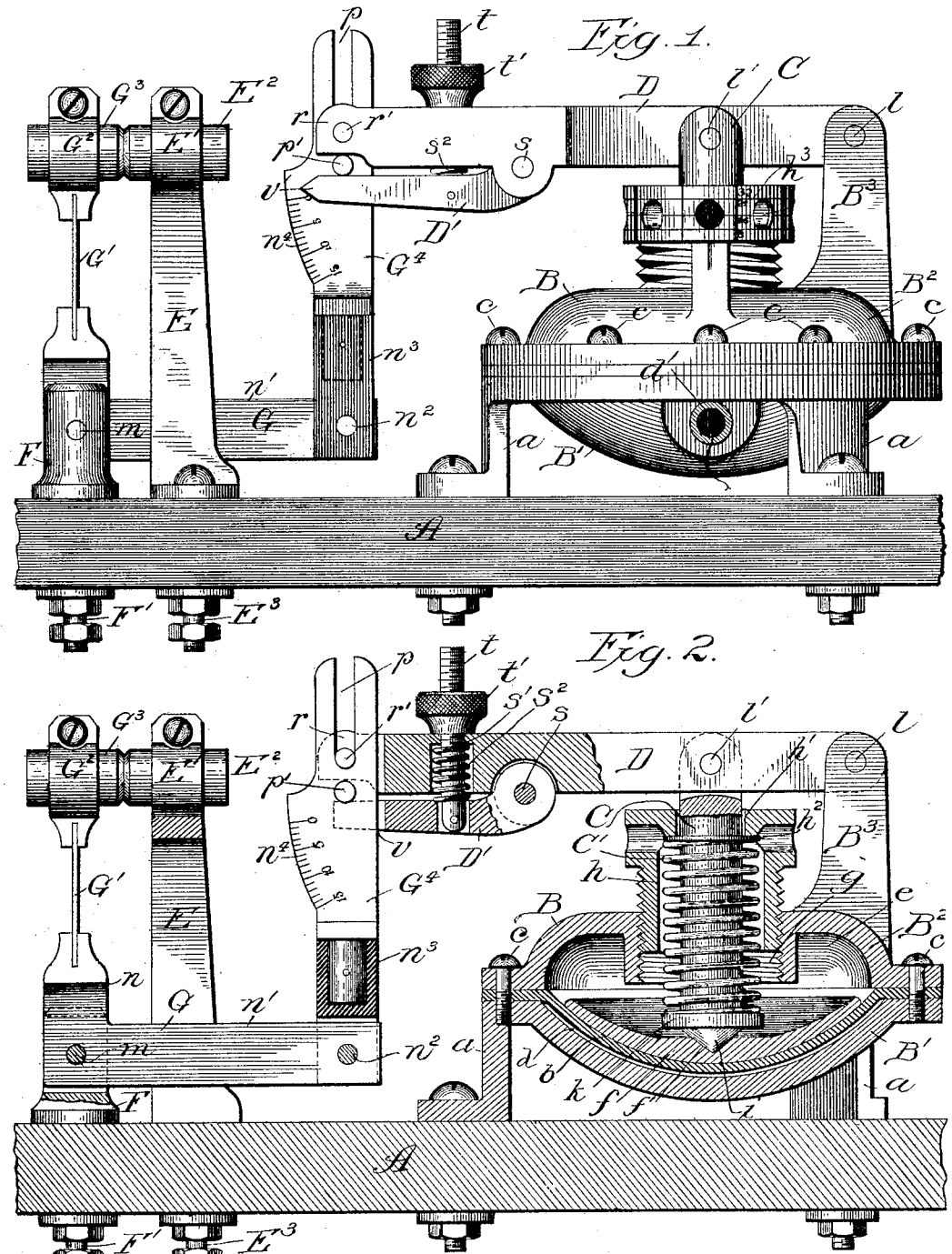
Witnesses:
Inventor:
Jacob L. Schureman,
By Dyrenforth, Dyrenforth & Lee,
Att'ys.

UNITED STATES PATENT OFFICE.

JACOB L. SCHUREMAN, OF CHICAGO, ILLINOIS.

PRESSURE-REGULATOR.

SPECIFICATION forming part of Letters Patent No. 706,260, dated August 5, 1902.

Application filed May 31, 1902. Serial No. 109,665. (No model.)

*To all whom it may concern:*

Be it known that I, JACOB L. SCHUREMAN, a citizen of the United States, residing at Chicago, in the county of Cook and State of Illinois, have invented new and useful Improvements in Pressure-Regulators, of which the following is a specification.

My invention relates to improvements in regulating devices for use more especially in connection with fluid pumps or compressors driven by electric motors.

The function of the device is to cause the pump or compressor driving electric motor to cease operation when the fluid-pressure generated exceeds a predetermined limit and to start again when the said fluid-pressure falls below a predetermined limit.

My object is to provide a pressure-regulator for the above purpose of an improved construction which renders it automatic in operation and capable of ready adjustment to raise or lower the said pressure limits and to vary the same with relation to each other.

In the drawings, Figure 1 is a broken view showing my improved regulator in side elevation, and Fig. 2 a sectional view of the same.

A is a base board or slab forming a support for the various parts of the device.

B is a chamber or casing formed of two separable parts B' B². The lower part B' is upon legs $a$, fastened to the base A. Clamped circumferentially between the parts B' B² is a flexible diaphragm $b$, the parts being fastened together by means of screws $c$. The diaphragm $b$ separates the interior of the casing B into two chambers $d$ $e$. Communicating with the chamber $d$ is a pipe $d'$, extending from a fluid-pressure reservoir. (Not shown.) In the chamber $e$ and resting loosely upon the diaphragm $b$ is a cup-shaped disk $f$, having a central recess $f'$ in its concave upper side. In the part B² is a central threaded opening $g$, fitted with a chambered screw-plug $h$, provided in its upper end with a guide-opening $h'$.

C is a plunger-stem extending downward through the guide-opening $h'$ and formed with a conical lower end $i$, fitting the recess $f'$ of the disk $f$. The lower end portion of the stem C is formed with a flange $k$, and in the top of the chambered plug $h$ is a washer $h^2$, surrounding the stem C. Also surrounding the stem C and confined between the washer $h^2$ and flange $k$ is a spring C'.

On the part B² of the casing is an upright B³, bifurcated at its upper end, and fulcrumed at its end upon a pin $l$ in the said bifurcated part is a horizontally-disposed lever D. The upper end portion of the plunger-stem C is bifurcated, as indicated, the said lever D passing through the said bifurcated part and being pivotally secured to the stem by means of a pin $l'$.

Mounted upon the base A is a bifurcated standard E, having a head E', forming a holder for a carbon contact-piece E². Forming a part of or connected with the standard E on the under side of the base A is a binding-post E³. Also mounted upon the base A is a short bifurcated standard F, provided upon the under side of the base A with a binding-post F'. The binding-posts F' E³ are insulated from each other and the base A or the latter may be of insulating material. Fulcrumed upon a pin $m$ in the standard F is a bell-crank lever G, having an upward-extending arm $n$ and a horizontally-disposed arm $n'$, passing between the legs of the standard E without contact therewith. On the arm $n$ is a spring extension G', carrying a head G², forming a holder for a carbon contact G³. In the free end portion of the lever-arm $n'$ is a pin $n^2$, upon which is pivotally mounted a socket-piece $n^3$ of hard rubber or other insulating material. In the socket-piece $n^3$ is an upright bar or strip G⁴, bifurcated along its upper end portion to form a socket $p$. Marked upon the strip G⁴ in the position shown is a scale $n^4$, which may be as indicated. The free end portion of the lever D is bifurcated, as indicated at $r$, to loosely embrace the strip G⁴, and in the said part $r$ is a pin $r'$, which moves in the socket $p$ of the strip. On the under side of the free end portion of the lever D is a finger D', pivotally secured in place by means of a pin $s$. In the lever D is a vertical opening $s'$, through which extends an adjusting-screw $t$, pivotally connected at its lower end to the finger D' between the ends of the latter. Around the screw $t$ and confined between the finger D' and the lever D is a spring $s^2$, and upon the screw $t$ at the upper side of lever D is a thumb-nut $t'$. Extending through the strip G⁴ and a short distance beyond opposite sides thereof in the position shown is a pin p' in the path of the bifurcated end portion v of the finger D', and the fork v' of the finger D' forms a pointer movable across the scale n⁴.

As before stated, the chamber d of the casing B communicates through the pipe d' with a fluid-pressure reservoir, which is supplied with pressure by a pump or compressor actuated from an electric motor. The binding-posts E³ F' may be and preferably are in circuit with a solenoid-switch device (not shown) which controls the current to the motor, whereby when the contacts E² G³ are brought together the motor is operated to actuate the pump and whereby when the contacts E² G³ are separated the motor, and consequently the pump, ceases operation.

In practice when the pressure in the reservoir-pipe d' and chamber d exceeds the resistance of the spring C' the diaphragm b is raised with the disk f, thereby raising the stem C and lever D. The resistance of the spring C' may be increased or diminished by turning the screw-plug h, and it will be apparent that the resistance of the spring increases during the rise of the diaphragm b and attendant parts. It is desirable in devices of this kind to provide means whereby the pressure in the reservoir may fall somewhat after the motor has been stopped and before it is started again to avoid too constant starting and stopping of the motor. In some cases a variation of one-quarter of a pound may be sufficient, while in other cases a variation of fifteen or more pounds may be desirable. As before stated, one of the objects of my invention is to provide means for varying the pressure limits with relation to each other, and this may be done in the present device by adjusting the finger D' by means of the thumb-nut t'. When the diaphragm b is raised and raises the lever D, the finger D' engages the pin p, raising the strip G⁴ and swinging the bell-crank lever upon the fulcrum m to move the contact G³ out of engagement with the contact E². When the finger D' is in the position shown with relation to the lever D, the initial rise of the diaphragm will break the electric current. By turning the thumb-nut t' to move the finger D' downward with relation to the lever D the distance to which the diaphragm must rise and the spring C' be compressed before the current is broken will be increased. When the pressure in the reservoir and chamber d falls below the resistance of the spring C', the lever D at its pin r' engages the base of the socket p, presses the strip G⁴ downward, and swings the bell-crank lever G upon the fulcrum m to cause the contact G³ to bear against the contact E² and close the circuit. In the construction shown I provide for a variation of fifteen pounds, according to the scale marked upon the strip G⁴. Therefore, presuming, for example, that the spring C' is tensioned to hold the diaphragm in the lowest position against a pressure of one hundred pounds to the square inch, the contacts G³ E² will be pressed into engagement while the reservoir-pressure is at one hundred pounds to the square inch or under, and the contacts will be separated whenever the said pressure rises to a degree between one hundred and one hundred and fifteen pounds to the square inch, depending upon the position at which the finger D' is adjusted along the scale n⁴. The spring-arm G' forms a yielding support for the contact G³ to prevent the contacts from pressing together with sufficient force to injure each other.

The socket-piece n³ is formed of rubber as a means of insulating the parts from each other, and the bell-crank lever G turns with sufficient frictional resistance upon its fulcrum to insure its remaining in either adjusted position.

The tension of the spring C' may be regulated by turning the plug h in the threaded opening g. On the casing B is a pointer c' and on the screw-plug is a scale h³, which in the turning of the plug indicates the resistance of the spring C'.

While I prefer to construct my improvements throughout as shown and described, they may be variously modified without departing from the spirit of my invention as defined by the claims.

What I claim as new, and desire to secure by Letters Patent, is—

1. In a fluid-pressure regulator for electrically-driven fluid-pressure generators, the combination of a chamber having a spring-pressed movable diaphragm, exposed on one side to the generated fluid-pressure, to be moved thereby, when excessive, against the resistance of the spring, an electric current making and breaking contact, contact-moving lever mechanism connected with the diaphragm, and adjusting mechanism interposed in said lever mechanism for regulating the effect of the diaphragm's movements upon the contact, substantially as and for the purpose set forth.

2. In a fluid-pressure regulator for electrically-driven fluid-pressure generators, the combination with a chamber having a movable diaphragm exposed at one side to the generated fluid-pressure, a spring bearing against the opposite side of said diaphragm, means for increasing and decreasing the resistance of said spring, an electric current making and breaking contact, a lever connected with said diaphragm, a contact-moving lever, and connecting means between said levers adjustable to vary the movement of the said contact-lever with relation to the said diaphragm-lever, substantially as and for the purpose set forth.

3. In a fluid-pressure regulator for electrically-driven fluid-pressure generators, the combination with a chamber having a movable diaphragm exposed at one side to the generated fluid-pressure, a spring bearing against the opposite side of said diaphragm, means for increasing and decreasing the resistance of said spring, an electric current making and breaking contact, a lever D connected with said diaphragm, a finger D' pivoted upon said lever, adjusting means for said finger, a strip in the path of said lever and finger, to be moved thereby alternately in opposite directions, and having a scale, and an electric current making and breaking contact operatively connected with said strip, substantially as and for the purpose set forth.

JACOB L. SCHUREMAN.

Witnesses:
   ALBERT D. BACCI,
   M. S. MACKENZIE.